(12) United States Patent
Wells et al.

(10) Patent No.: US 7,673,889 B2
(45) Date of Patent: Mar. 9, 2010

(54) DIRECT LOADING APPARATUS FOR PALLET RELATED SYSTEMS

(75) Inventors: James S. Wells, Fountain Valley, CA (US); Anibal J. Garcia, Chino, CA (US); Myles A. Rohrlick, San Diego, CA (US); John B. Simmons, Corona, CA (US); Benjamin A. Harber, Costa Mesa, CA (US); Thomas K. Reiner, Sherman Oaks, CA (US)

(73) Assignee: The Boeing Company, Chicago, IL (US)

( * ) Notice: Subject to any disclaimer, the term of this patent is extended or adjusted under 35 U.S.C. 154(b) by 732 days.

(21) Appl. No.: 11/252,702

(22) Filed: Oct. 18, 2005

(65) Prior Publication Data

US 2007/0085288 A1 Apr. 19, 2007

(51) Int. Cl.
  *B62B 1/00* (2006.01)
  *B60P 1/16* (2006.01)
  *B60P 1/28* (2006.01)
(52) U.S. Cl. ............... 280/79.11; 280/79.3; 280/33.995; 280/33.996; 280/33.997; 187/244; 414/467; 414/572
(58) Field of Classification Search ................ 280/79.3, 280/79.11, 33.995, 33.996, 33.997, 33.998; 187/244, 242, 225; 414/788.2, 137.2, 227, 414/234, 253, 373, 467, 572, 374, 376, 389, 414/536, 809
See application file for complete search history.

(56) References Cited

U.S. PATENT DOCUMENTS

| | | | | |
|---|---|---|---|---|
| 2,992,750 A * | 7/1961 | Brock | ......................... | 414/483 |
| 3,780,894 A * | 12/1973 | Holmes et al. | .............. | 414/485 |
| 4,077,532 A | 3/1978 | Bryan | | |
| 4,134,345 A * | 1/1979 | Baldwin et al. | ............... | 410/70 |
| 4,408,739 A * | 10/1983 | Buchsel | ................... | 244/137.1 |
| 4,915,567 A * | 4/1990 | Ellingsen | .................... | 414/345 |
| 5,372,353 A * | 12/1994 | West | ........................ | 254/10 B |
| 5,417,540 A * | 5/1995 | Cox | ........................... | 414/495 |
| 5,701,966 A * | 12/1997 | Amico | ........................ | 180/7.2 |
| 6,062,806 A * | 5/2000 | Kern | .......................... | 414/572 |
| 6,629,581 B2 | 10/2003 | Lambiaso | | |
| 6,668,950 B2 * | 12/2003 | Park | ........................... | 180/7.1 |
| 6,817,578 B1 * | 11/2004 | Garcia et al. | ............. | 244/137.1 |
| 7,134,829 B2 * | 11/2006 | Quenzi et al. | ............... | 414/482 |
| 2003/0221878 A1 * | 12/2003 | Park | ........................... | 180/7.1 |
| 2004/0018067 A1 * | 1/2004 | Taylor et al. | .................. | 410/46 |
| 2004/0099187 A1 * | 5/2004 | Cox, Jr. | ................... | 108/51.11 |
| 2005/0183896 A1 * | 8/2005 | Fenelli et al. | .............. | 180/65.3 |
| 2007/0048115 A1 * | 3/2007 | Fenelli et al. | ................ | 414/512 |

\* cited by examiner

*Primary Examiner*—Lesley Morris
*Assistant Examiner*—Jacob Meyer
(74) *Attorney, Agent, or Firm*—Harness, Dickey & Pierce, P.L.C.

(57) ABSTRACT

An apparatus for transporting and handling a cargo platform is provided. The apparatus includes a frame having a cradle beam that receives the cargo platform. The cradle beam supports a lower surface of the cargo platform. The apparatus further includes a locking mechanism operably associated with the cradle beam and actuates to securely fasten the cargo platform to the frame when the cargo platform is rested upon the cradle beam. The apparatus also includes a plurality of wheel assemblies for wheeling the frame along a ground surface.

12 Claims, 13 Drawing Sheets

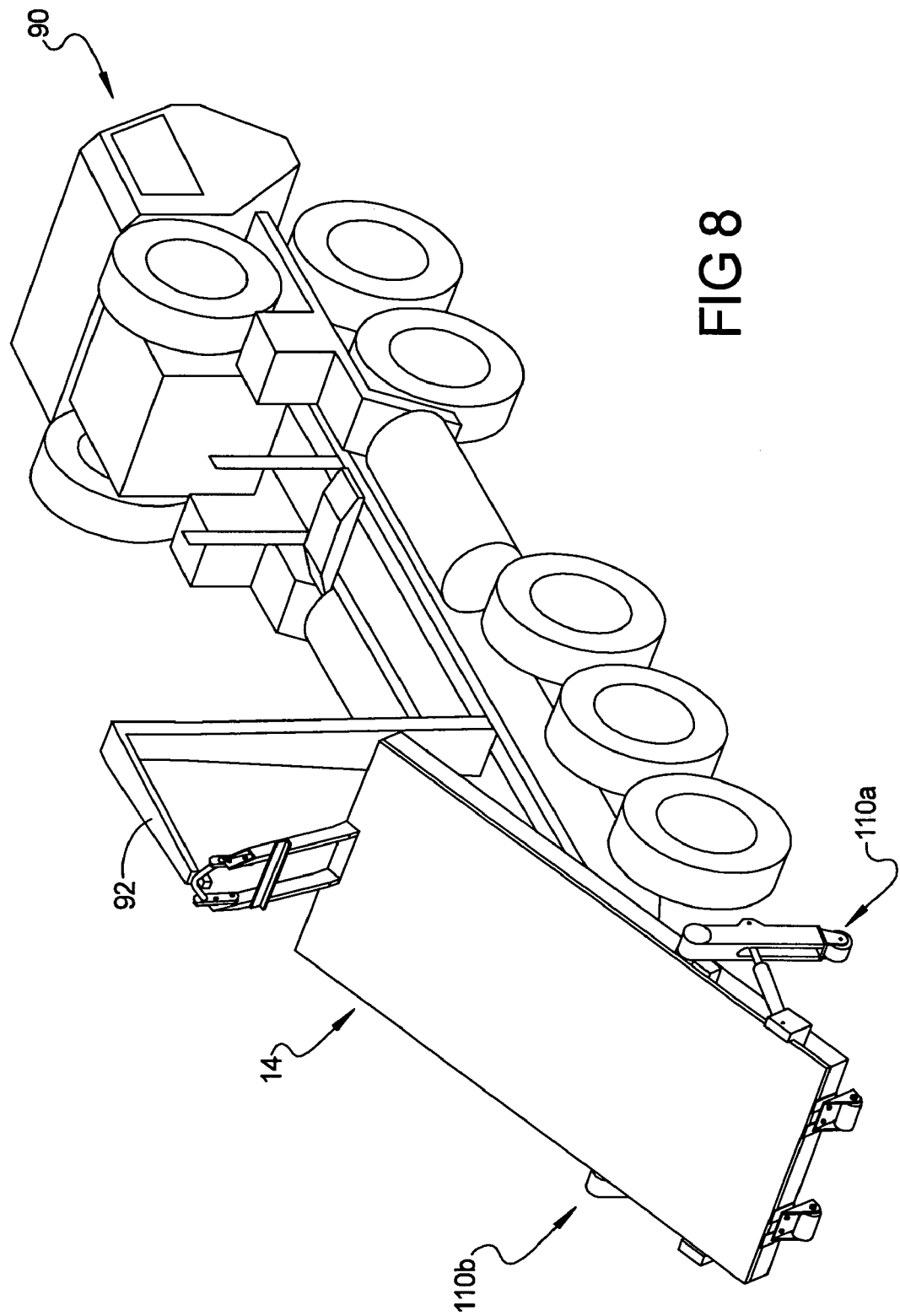

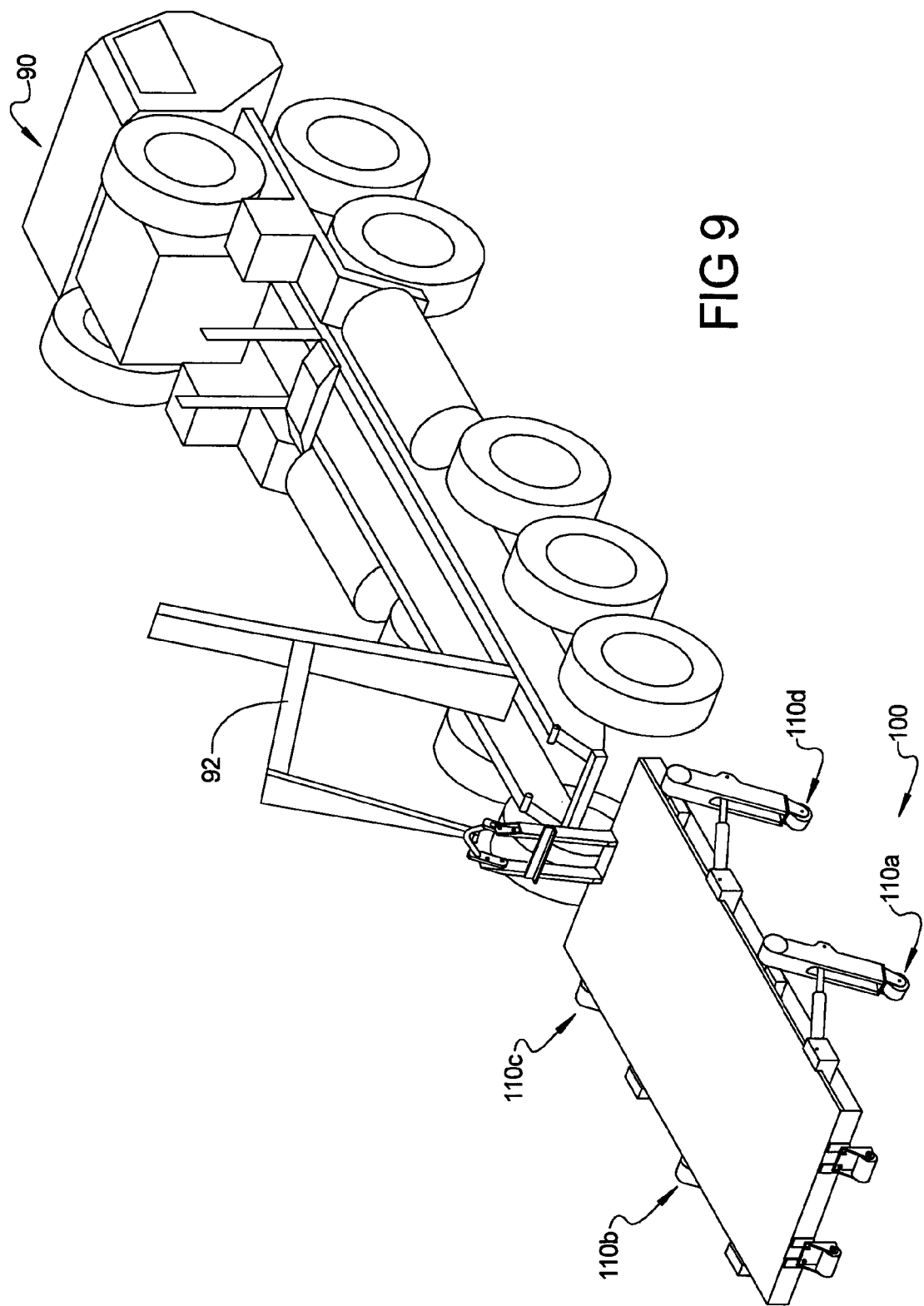

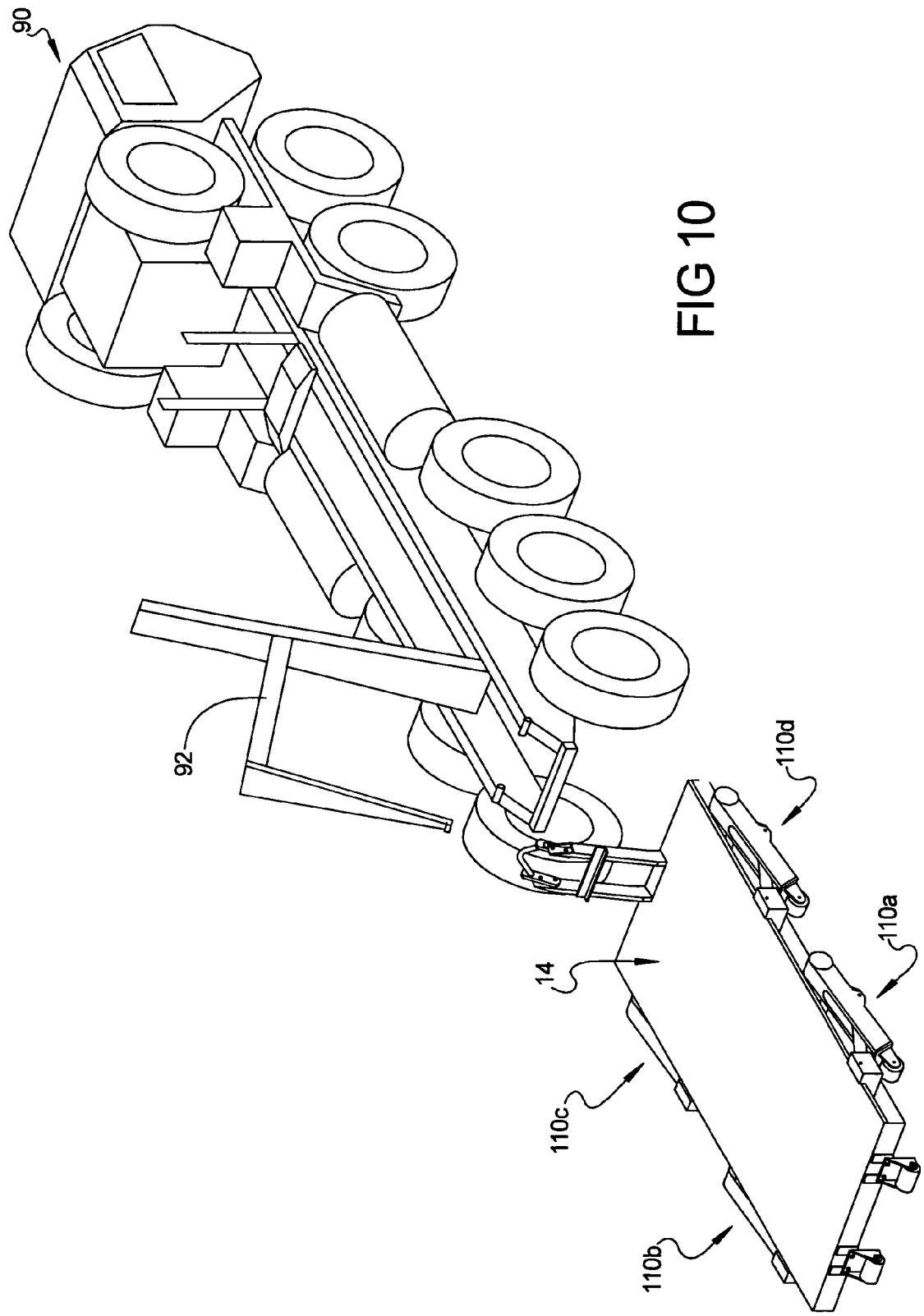

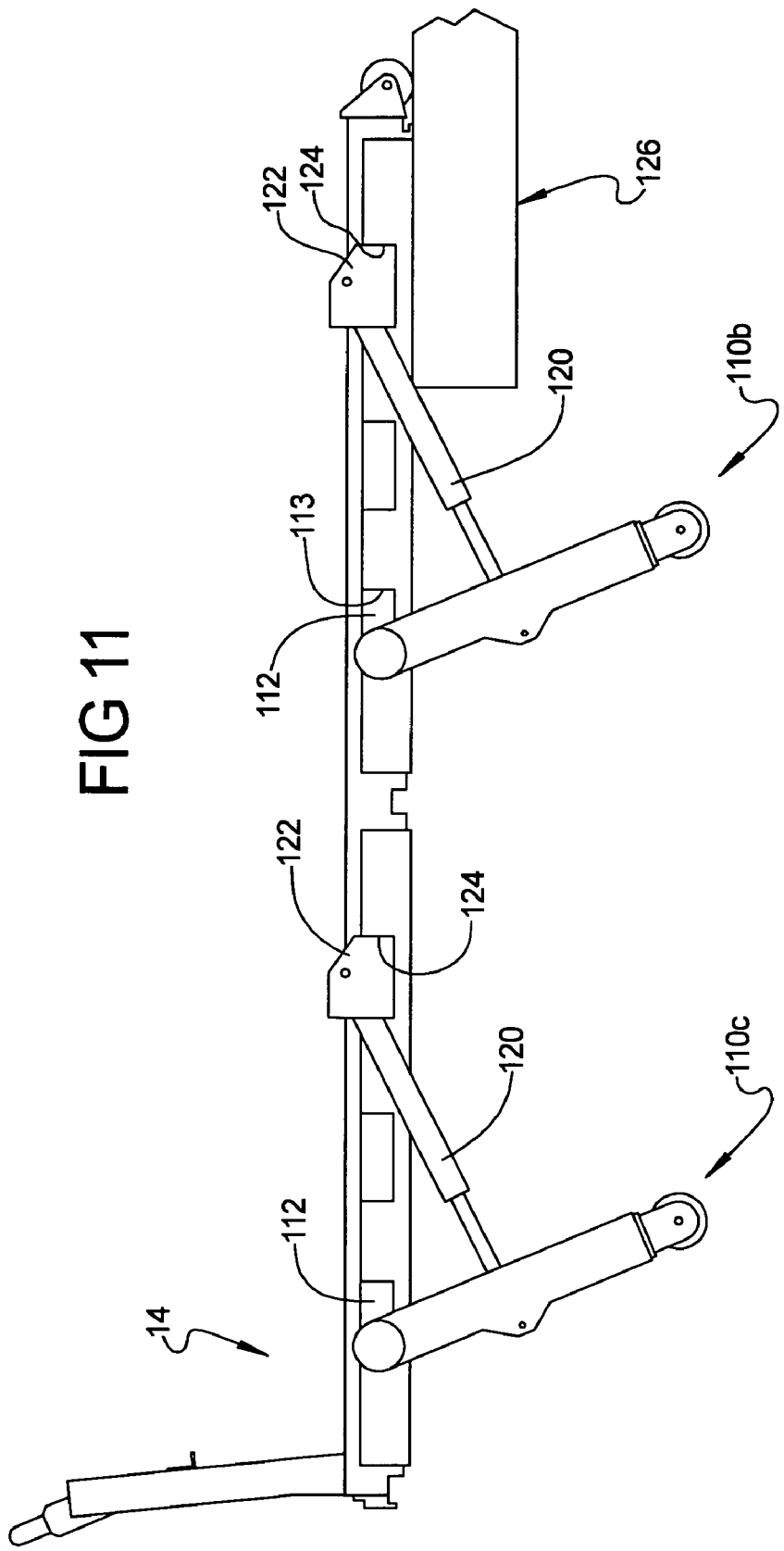

DIRECT LOADING APPARATUS FOR PALLET RELATED SYSTEMS

FIELD OF THE INVENTION

The present invention relates to cargo handling equipment and, more specifically, to cargo apparatuses for transport aircraft.

BACKGROUND OF THE INVENTION

An aircraft requires special cargo handling equipment for loading and unloading cargo platforms. In military airlift applications and similar uses of large cargo aircrafts, where little or no ground-based cargo loading equipment is available, there has been a need for loading and unloading cargo platform related systems without the use of a conventional K-loader or an overhead crane.

Today, cargo platforms are not directly loaded from a load handling system (LHS) vehicle to an aircraft because there is insufficient overhead clearance to permit the operation of the LHS vehicle loading arm. This makes direct loading impossible. A cargo platform must be demounted from the LHS vehicle at some distance from the aircraft. Afterwards, the cargo platform is placed on a K-loader by an overhead crane for loading onto an aircraft. This, however, requires a large amount of material handling equipment to be available at an onload and offload site. Additionally, this requires multiple aircraft loads of material handling equipment (e.g. forklift equipment, K-loader, and/or an overhead crane) to be flown to the onload/offload site and set up prior to the arrival of the aircraft transporting the cargo platforms.

Therefore, a need exists for a means to load and unload cargo platforms to and from an aircraft without the need for large material handling equipment.

SUMMARY OF THE INVENTION

In accordance with the present invention, an apparatus for transporting and handling a cargo platform is provided. In one preferred form, the apparatus includes a frame having a cradle beam adapted to receive a cargo platform. The cradle beam supports the cargo platform from underneath. The apparatus further includes a locking mechanism coupled to the cradle beam and adapted to actuate as the cargo platform is rested upon the cradle beam, wherein the locking mechanism secures the cargo platform to the frame. Additionally, the apparatus includes a plurality of wheel assemblies coupled to the frame for transporting the frame along the ground.

In an alternative embodiment, the apparatus includes a first arm assembly adapted to couple to a first forklift slot of the cargo platform. Additionally, the apparatus comprises a leg assembly coupled to the arm assembly and adapted to support the cargo platform in a vertical position. The apparatus also includes a second arm assembly coupled to the leg assembly and adapted to couple to a second forklift slot of the cargo platform. The second arm assembly is further adapted to adjust the leg assembly to a plurality of height levels.

The present invention provides the advantage of enabling a cargo platform to be loaded and unloaded from an aircraft without the use and need for various forms of material handling equipment. Additionally, the present invention decreases the need for material handling equipment to be separately flown to the onload/offload sites. Another advantage of the present invention is that it allows cargo platforms to be stowed away at ground level until needed between being loaded and unloaded from an aircraft.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2A is a cross-sectional view of a cradle beam of the cargo transportation apparatus;

FIG. 8 is a perspective overhead view of the direct loading apparatus being loaded or unloaded with the cargo platform in accordance with the present invention;

FIG. 9 is a perspective overhead view of the direct loading apparatus loaded with the cargo platform and placing the cargo platform in a stowaway position, in accordance with the present invention;

FIG. 10 is a perspective overhead view of the direct loading apparatus of FIG. 9 resting on a ground surface in accordance with the present invention; and, FIG. 11 is a side elevation view of the direct loading apparatus loaded with the cargo platform and placed in an extended position to load or unload the cargo platform.

DETAILED DESCRIPTION OF THE PREFERRED EMBODIMENTS

The following description of various preferred embodiments is merely exemplary in nature and is in no way intended to limit the invention, its application, or uses.

Figure 1:
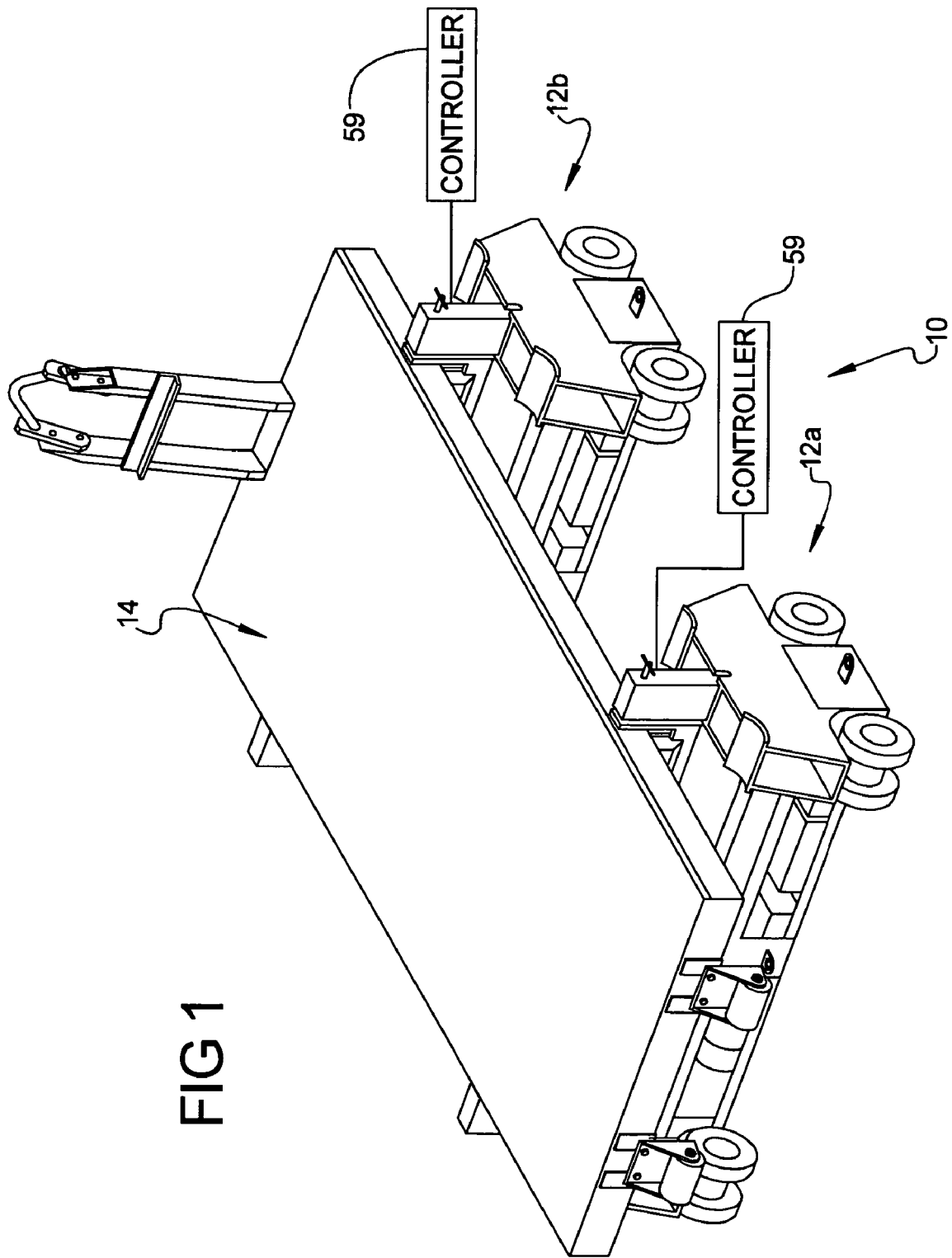
FIG. 1 is a perspective view of one preferred embodiment including a direct loading apparatus transporting and handling a cargo platform in accordance with the present invention.

Referring particularly to FIGS. 1 through 6, one preferred embodiment of a direct loading system 10 is illustrated. As shown in FIG. 1, the direct loading system 10 comprises a first and second cargo transportation apparatuses 12a, 12b for transporting and handling a cargo platform 14. The cargo platform 14 may comprise, for example, a container roll in/out platform (CROP), modular inter-modal platform (MIP) or an enhanced aerial delivery system (EADS) platform. Additionally, cargo transportation apparatuses 12a and 12b are identical in physical structure and functionality.

Figure 2:
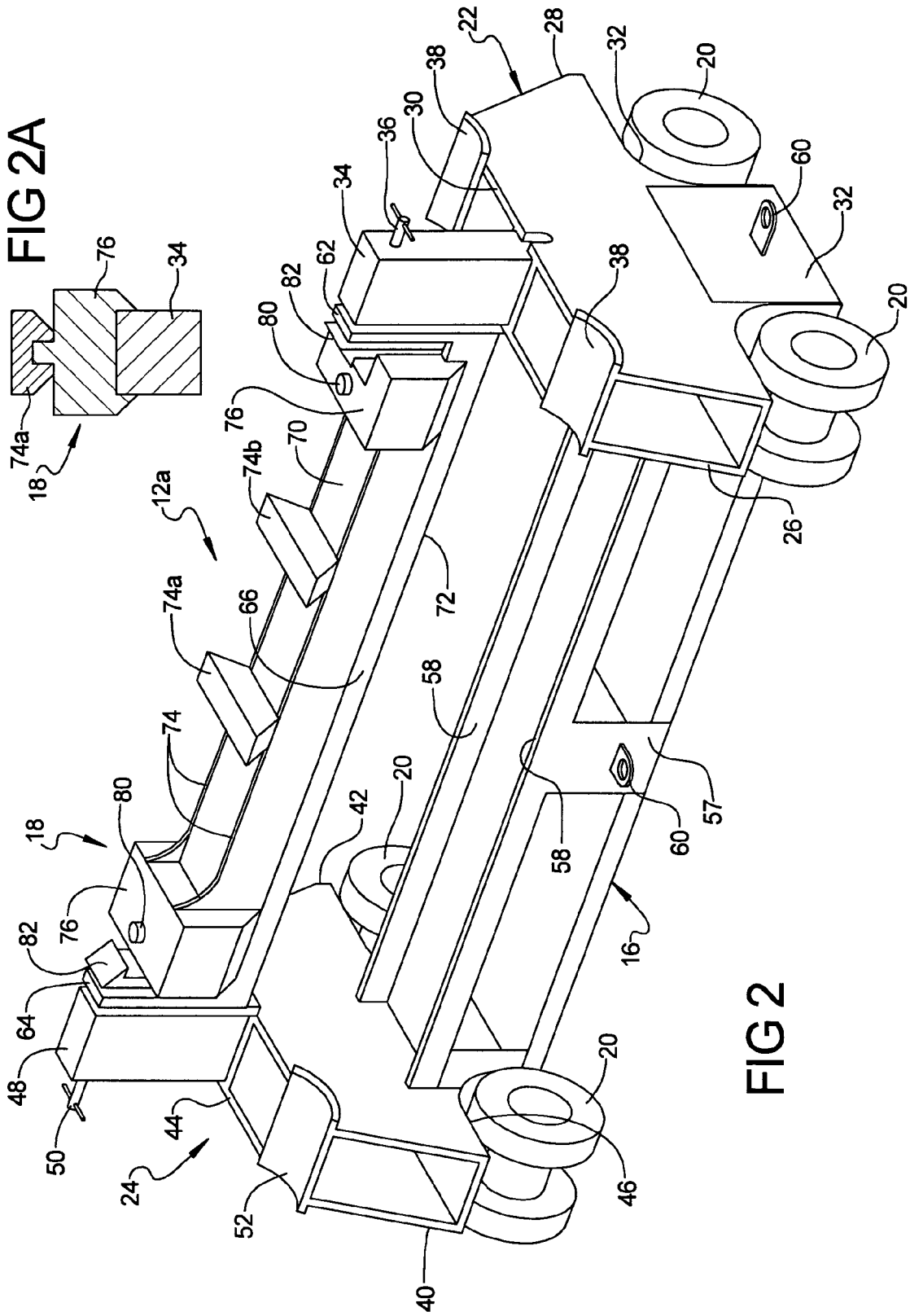
FIG. 2 is a perspective view of a cargo transportation apparatus of the direct loading apparatus in accordance with the present invention.

As shown in FIG. 2, the first cargo transportation apparatus 12a includes a frame 16, a receiving bar or a cradle beam 18, and four wheel assemblies 20. The frame 16 is coupled to the cradle beam 18. Additionally, the wheel assemblies 20 are coupled to the frame 16 to support the apparatus 12a for rolling movement on a surface.

Referring to FIGS. 1 and 2, the frame 16 includes a first side unit 22 and a second side unit 24. The first side unit 22 comprises a first front portion 26, a first rear portion 28, a first top portion 30, and a first bottom portion 32. The first side unit 22 may also include a first elevator unit 34. The cradle beam 18 is pivotally secured to the first elevator unit 34. The first elevator unit 34 adjusts to a plurality of positions to achieve a desired height. More specifically, the first elevator unit 34 raises and lowers the cradle beam 18 in a vertical direction to the desired height. The first elevator unit 34 may adjust the cradle beam 18 to the desired height in order to position the cargo platform 14 for loading or unloading to a ramp of an aircraft (not shown) or another location. Although, the first elevator unit 34 may be operated manually or powered by various methods (e.g. electrically, hydraulically or pneumatically), the first elevator unit 34 may include a hydraulic pump (not shown) to adjust the cradle beam 18 in the vertical direction. Additionally, the first elevator unit 34 includes a securing pin 36 that secures the cradle beam 18 in a desired position including from a horizontal level position, or a angled (i.e., non-horizontal) position in order to accommodate a loading or unloading angle of the cargo platform 14. The cradle beam 18 will be further discussed in the following paragraphs.

Figure 3:
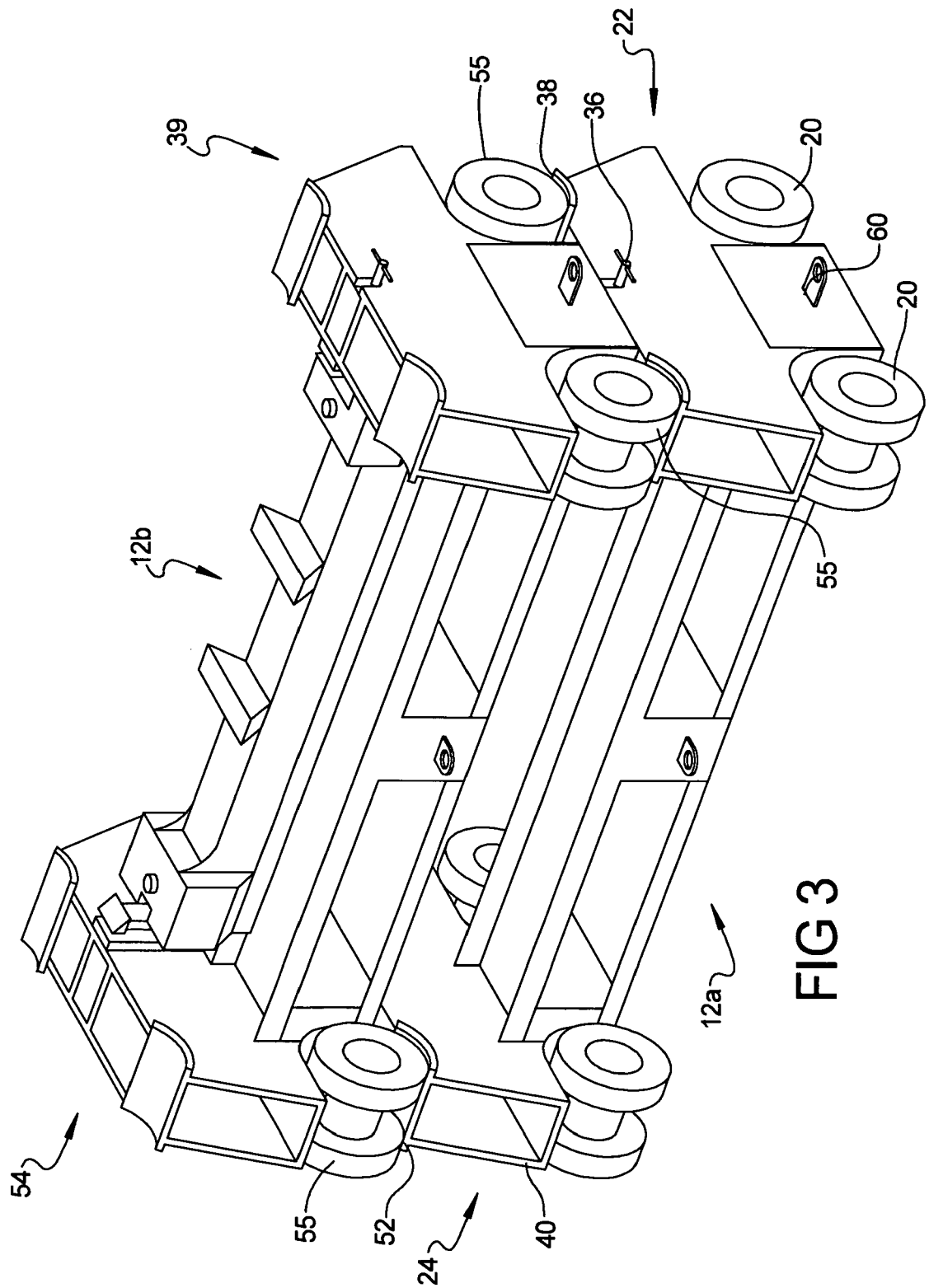
FIG. 3 is a perspective view of the direct loading apparatus in a stowaway position in accordance with the present invention.

As shown in FIGS. 2 and 3, the first top portion 30 of the first side unit 22 may include a plurality of first recesses 38. Each first recess 38 is configured to allow the first unit 39 of the second cargo transportation apparatus 12b to nest upon the first side unit 22 of the first cargo transportation apparatus 12a. More specifically, each first recess 38 fits and accommodates a curvature of a wheel of a wheel assembly 20 of the second cargo transportation apparatus 12b. This means that the first side unit 39 of the second cargo transportation apparatus 12b is stacked upon the first unit 22 of the first cargo transportation apparatus 12a. More specifically, the second wheel assemblies 55 of the first side unit 39 of the second cargo transportation apparatus 12b rests within the first recesses 38 of the first cargo transportation apparatus 12a (FIG. 3). While only two cargo transportation apparatuses 12a, 12b are shown stacked together, a greater number of apparatuses 12 may be stacked on top of one another.

Referring to FIG. 2, the second side unit 24 comprises a second front portion 40, a second rear portion 42, a second top portion 44, and a second bottom portion 46. Additionally, the second side unit 24 may include a second elevator unit 48. The second elevator unit 48 is identical in construction to the first elevator unit 34 and raises and lowers the cradle beam 18 in a vertical direction to a desired height. Additionally, the second elevator unit 48 is adapted to adjust the cradle beam 18 to the desired height level in order to transport the cargo platform 14 (see FIG. 1) for loading or unloading to the ramp of the aircraft or another location. Although the second elevator unit 48 may be operated manually or powered by various methods (e.g. electrically, pneumatically, or hydraulically), the second elevator unit 48 preferably includes a hydraulic pump (not shown) to adjust the position of the cradle beam 18 in the vertical direction. The second elevator unit 48 includes a second securing pin 50 that pivots and secures the cradle beam 18 in a desired position including a horizontal level position to an angled position in order to accommodate a loading or unloading angle of the cargo platform 14.

Referring to FIGS. 2 and 3, the second top portion 44 of the second side unit 24 includes a plurality of second recesses 52 identical in shape and spacing to recesses 38 (only one being visible in FIG. 2). Each second recess 52 is configured to allow a second unit 54 of the second cargo transportation apparatus 12b to nest upon the second unit 24 of the first cargo transportation apparatus 12a. Referring to FIGS. 2 and 3, each second recess 52 is configured to fit and accommodate a wheel assembly 55 of the second cargo transportation apparatus 12b. This allows the second unit 54 of the second cargo transportation apparatus 12b to be stacked upon the second side unit 24 of the first cargo transportation apparatus 12a. More specifically, the wheel assemblies 55 of the second cargo transportation apparatus 12b rest within the second recesses 52 of the first cargo transportation apparatus 12a (FIG. 3).

Although the first side unit 22 and the second side unit 24 are identical in FIGS. 1-4 regarding structures and functions, a person of ordinary skill in the art could observe the benefit of having the first side unit 22 and the second side unit 24 designed having different structures and functions, whereas the second side unit 24 includes some, but not all, of the structures and functions of the first side unit 22.

As shown in FIG. 1, each cargo transportation apparatus 12a, 12b may also include a controller 59. The controller 59 may be coupled to the first elevator unit 34 and the second elevator unit 48. The controller 59 controls the vertical direction of each elevator unit 34, 48. More specifically, the first and second elevator units 34, 48 of the first side unit 22 and the second side unit 24 may be lowered individually such that the first elevator unit 34 of the first side unit 22 is positioned at a different height from the second elevator unit 48 of the second side unit 24. Additionally, the controller may synchronize the movement of the elevator units 34, 48 so that the elevator units 34, 48 are maintained at the same height.

Referring further to FIG. 2, the first side unit 22 and the second side unit 24 are coupled together via an attachment unit 57. The attachment unit 57 may comprise a plurality of tract rails 58 that are configured for use as a storage unit. Additionally, the attachment unit 57 may include one or more bridle rings 60. Bridle rings 60 may also be coupled to the first side unit 22 and the second side unit 24. Bridle rings 60 allow a user to attach a coupling device (not shown), for example, a rope, a chain, or strap, thereto to tow or pull the cargo transportation apparatus 12 from one location to another location. Additionally, the bridle rings 60 may be used with the coupling device to secure the cargo transportation apparatus 12 within an aircraft or vehicle during transport.

Referring to FIG. 2, the cradle beam 18 is coupled to the elevator units 34, 48 via the securing pins 36, 50. The cradle beam 18 includes a pair of oppositely disposed end surfaces 62, 64, a pair of oppositely disposed side surfaces 66, a top longitudinal extending surface 70, and a bottom longitudinal extending surface 72. The cradle beam 18 receives and supports the cargo platform 14 during loading and unloading operations.

Additionally, the cradle beam 18 includes a plurality of rails 74 coupled to the top longitudinal extending surface 70 and extending less than the length of the top longitudinal extending surface 70. The plurality of rails 74 is configured with a plurality of dividers 74a and 74b to receive and support an undersurface of the cargo platform 14. The plurality of rails 74 supports and guides the cargo platform 14 such that the cargo platform 14 is securely seated onto the cradle beam 18. Additionally, the plurality of rails 74 slides along a longitudinal direction for a predetermined distance (e.g. less than or about one or two inches) on the top longitudinal extending surface 70 in order to align with an aircraft ramp for an unloading operation.

Referring to FIGS. 2, 4, 4a and 4b, the cradle beam 18 includes a plurality of locking mechanisms 76. The locking mechanisms 76 are provided at opposite ends of the rails 74. Each locking mechanism 76 includes a base 77, a lock actuator assembly 80 and a lock key assembly 82. The lock actuator assembly 80 and the lock key assembly 82 are coupled to the base 77.

Figure 4:
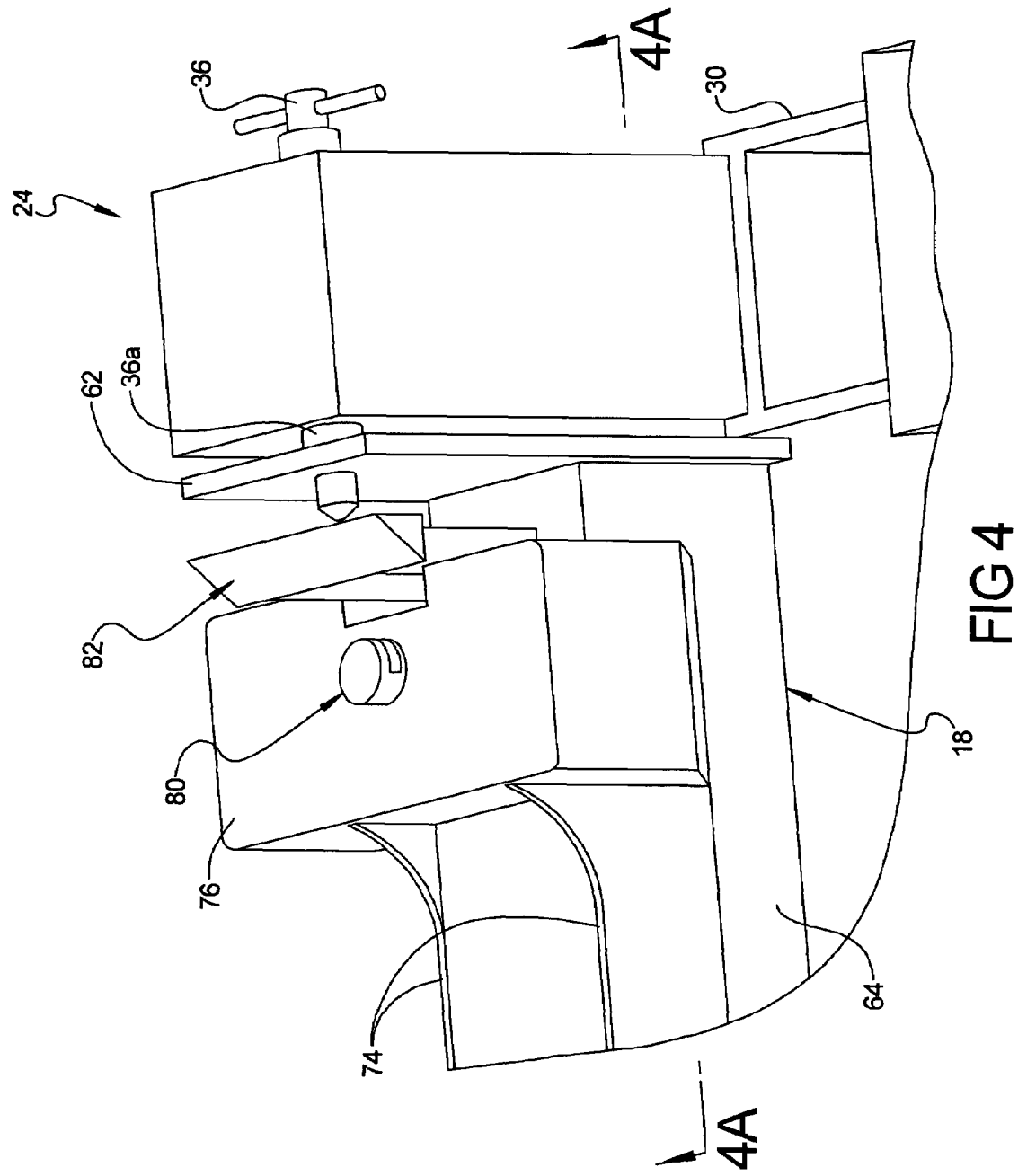
FIG. 4 is a partial perspective view of the cargo transportation apparatus locking mechanism in accordance with the present invention.
Figure 4A:
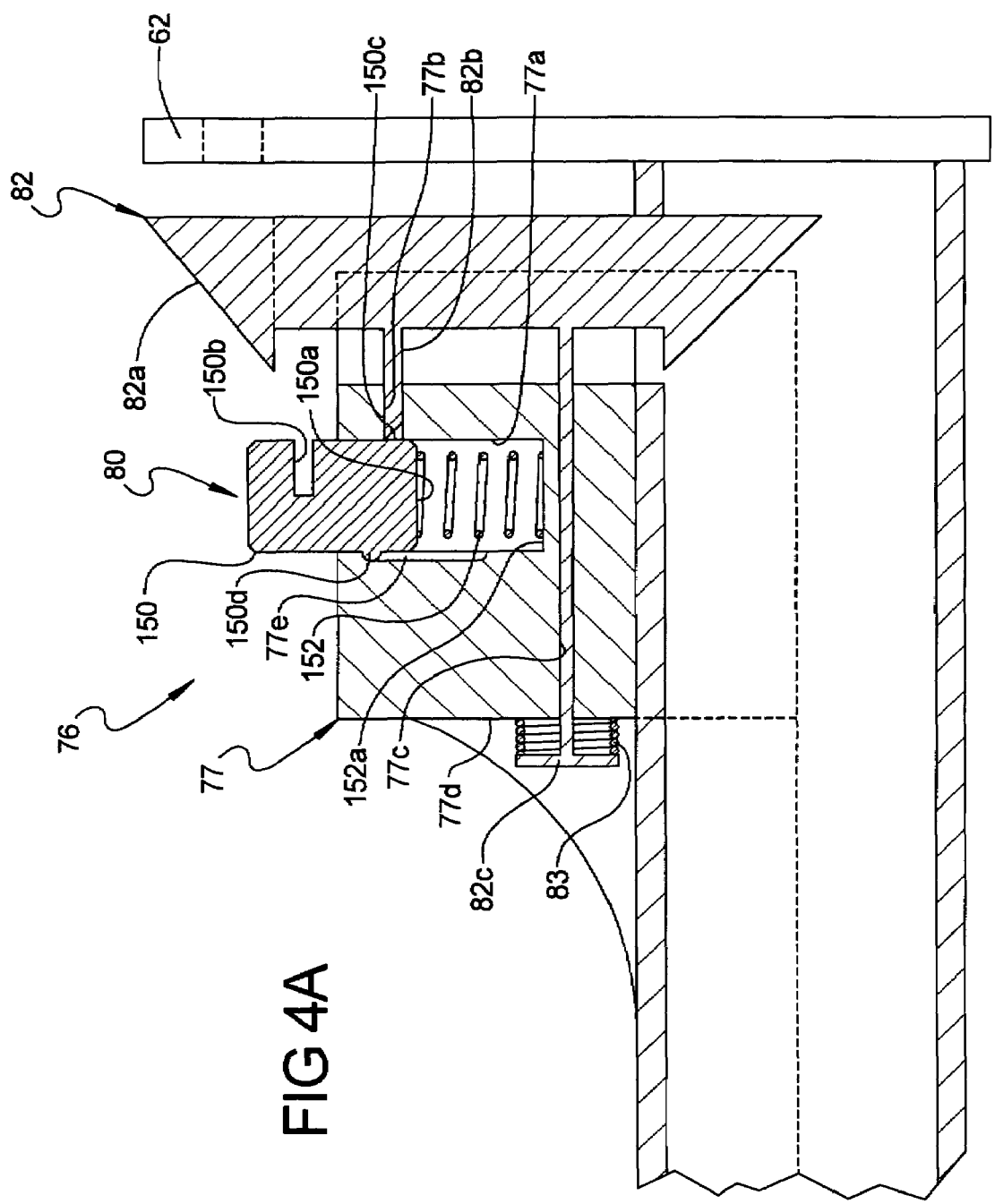
FIG. 4A is a cross-sectional view of FIG. 4 taken along line 4A of the locking mechanism having a locking actuator in an unlocked position.
Figure 4B:
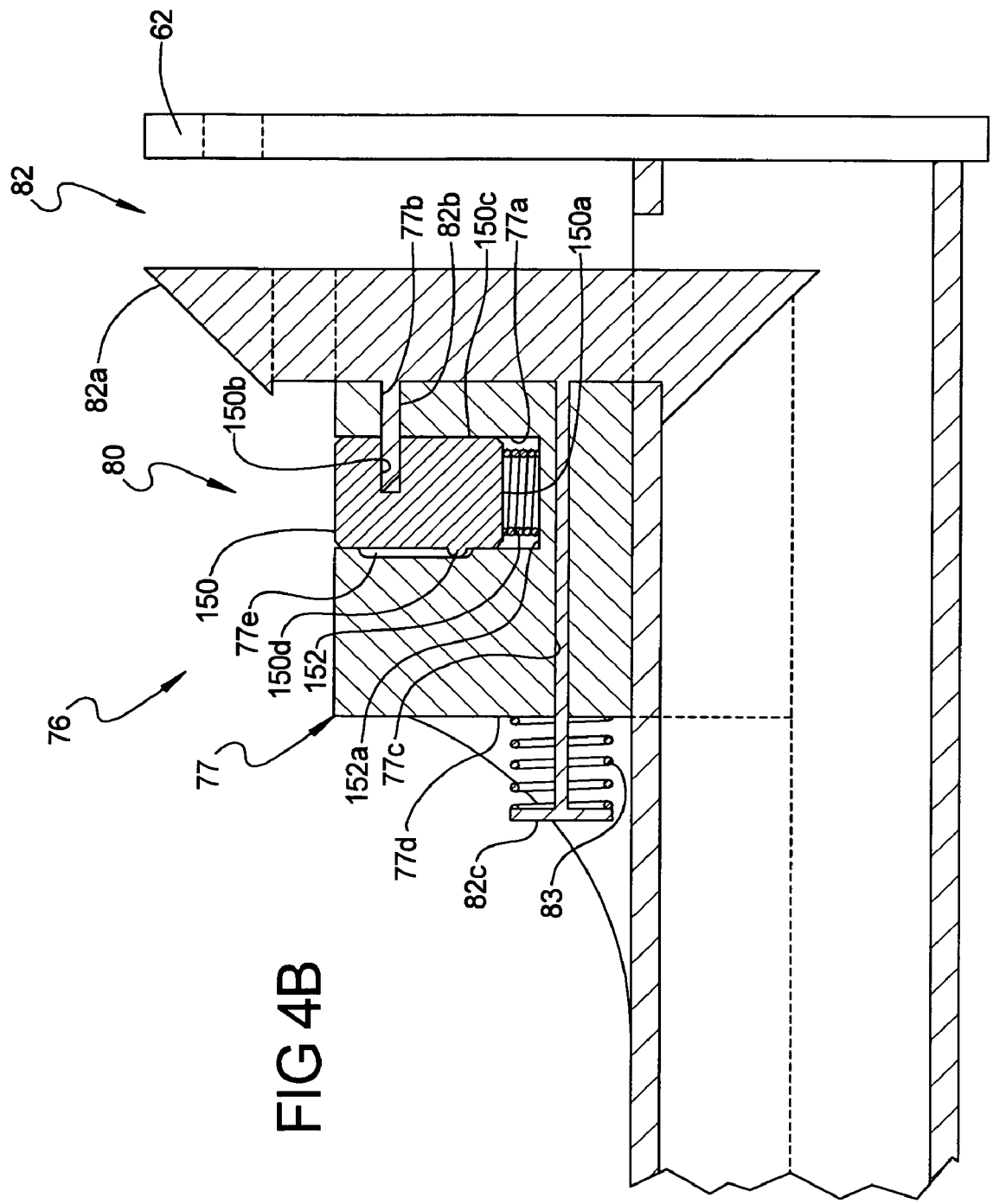
FIG. 4B is a cross-sectional view of FIG. 4A of the locking mechanism having the locking actuator in a locked position.

As shown in FIGS. 4a and 4b, the lock actuator assembly 80 includes a lock actuator 150 and a first spring 152. The lock actuator 150 rests on the first spring 152. More specifically, one end of the first spring 152 is coupled to a bottom 150a of the lock actuator 150; and, the opposite end of the first spring 152 is coupled to a bottom 152a of a recess 77a. The lock actuator 150 can be moved between a fully extended position (FIG. 4A) and a retracted position (FIG. 4B). Additionally, the lock actuator 150 and the first spring 152 are nested within the recess 77a of the base 77. The lock actuator 150 automatically activates the lock key assembly 82 to securely fasten and lock the cargo platform 14 to the cradle beam 18 when the cargo platform 14 is properly seated on the cradle beam 18.

The lock key assembly 82 can assume a locked position or an unlocked second position. The lock key assembly 82 includes a lock key portion 82a that latches the cargo platform 14 to the cradle beam 18. The lock key assembly 82 further includes a tongue portion 82b that extends through a first channel 77b of the base 77 to a side surface 150c of the lock actuator 150. Additionally, a plunger 82c of the lock key assembly 82 extends through a second channel 77c of the base 77. The plunger 82c is coupled to a second spring 83 that biases the lock key assembly 82 toward the lock actuator 150. The second spring 83 abuts an outer side surface 77d of the base 77 and a head of the plunger 82c, such that, as the second spring 83 compresses against the outer side surface 77d, the second spring 83 stores energy to extend the plunger 82c from a first position to a second position.

Additionally, the locking mechanism 76 may include a release mechanism (not shown) for releasing the lock key portion 82a from the cargo platform 14. The release mechanism is used by an operator to disengage the lock key portion 82a from the cargo platform 14, such that the lock key assembly 82 travels from the lock position to the unlock position. The release mechanism may include a rope, a handle, a C-clamp device or any other mechanism capable of latching onto lock key portion 82a and holding it away from the edge of the cargo platform 14.

In a locking operation, as the cargo platform 14 is placed upon the cradle beam 18, the lock actuator 150 and the first spring 152 are pressed downward from the extended position to the retracted position. As the lock actuator 150 travels downward, a guide notch 150b located on one side of the lock actuator 150 travels along a guiding track 77e to maintain the lock actuator 150 in a substantially straight line. Additionally, the guide notch 150d aids an open slot 150b of the lock actuator 150 to maintain a current orientation, such that as the open slot 150b is substantially aligned with the open slot 150b as the lock actuator 150 travels to a second position. When the lock actuator 150 is seated in the retracted position and the open slot 150b is aligned with the first channel 77b, the tongue portion 82b travels forward through the first channel 77b and into the open slot 150b of the lock actuator 150. This occurs because the plunger portion 82c of the lock key assembly 82 is biased by the second spring 83 to pull the lock key assembly 82 in a forward direction. Additionally, as the tongue portion 82b is moved forward, the lock key portion 82a advances forward and secures the cargo platform 14 to the cradle beam 18. When the cargo platform 14 includes a plurality of cutout notches (not shown) on a lower edge of the cargo platform 14, such as included within an Enhanced Aerial Delivery System (EADS) Platform, manufactured by the Boeing Company, Chicago, Ill., the lock key portion 82a of the lock key assembly 82 extends into one of the cutout notches of the cargo platform 14. If the cargo platform 14 does not include the plurality of cutout notches, the lock key portion 82a may attach to the lower edge of the cargo platform 14.

During an unlocking operation, the releasing mechanism pulls the lock key assembly 82 into the unlock position. As the cargo platform 14 is removed from the cradle beam 18, the open slot 150b of the lock actuator 150 is extended upward due to biasing of the first spring 152. When the releasing mechanism disengages the lock key assembly 82, the lock key assembly 82 is maintained in the unlock position as the tongue portion 82b rests on the one side of the lock actuator 150. This also causes the second spring 83 to compress and store energy in order to transition the lock key assembly 82 from the unlock position to the lock position as needed.

Additionally, provided on the first side unit 22 and the second side unit 24 of the frame 16 is the plurality of wheel assemblies 20 (FIG. 2). The wheel assemblies 20 are coupled to the bottom portion 32 of the first unit 22 and the bottom portion 46 of the second unit 24. Each wheel assembly 20 swivels in any direction in order for the frame 16 to travel along a surface. Additionally, each wheel assembly 20 includes a locking device (not shown) that locks and focuses the directional movement of the wheel assembly 20 in a desired direction.

Figure 5:
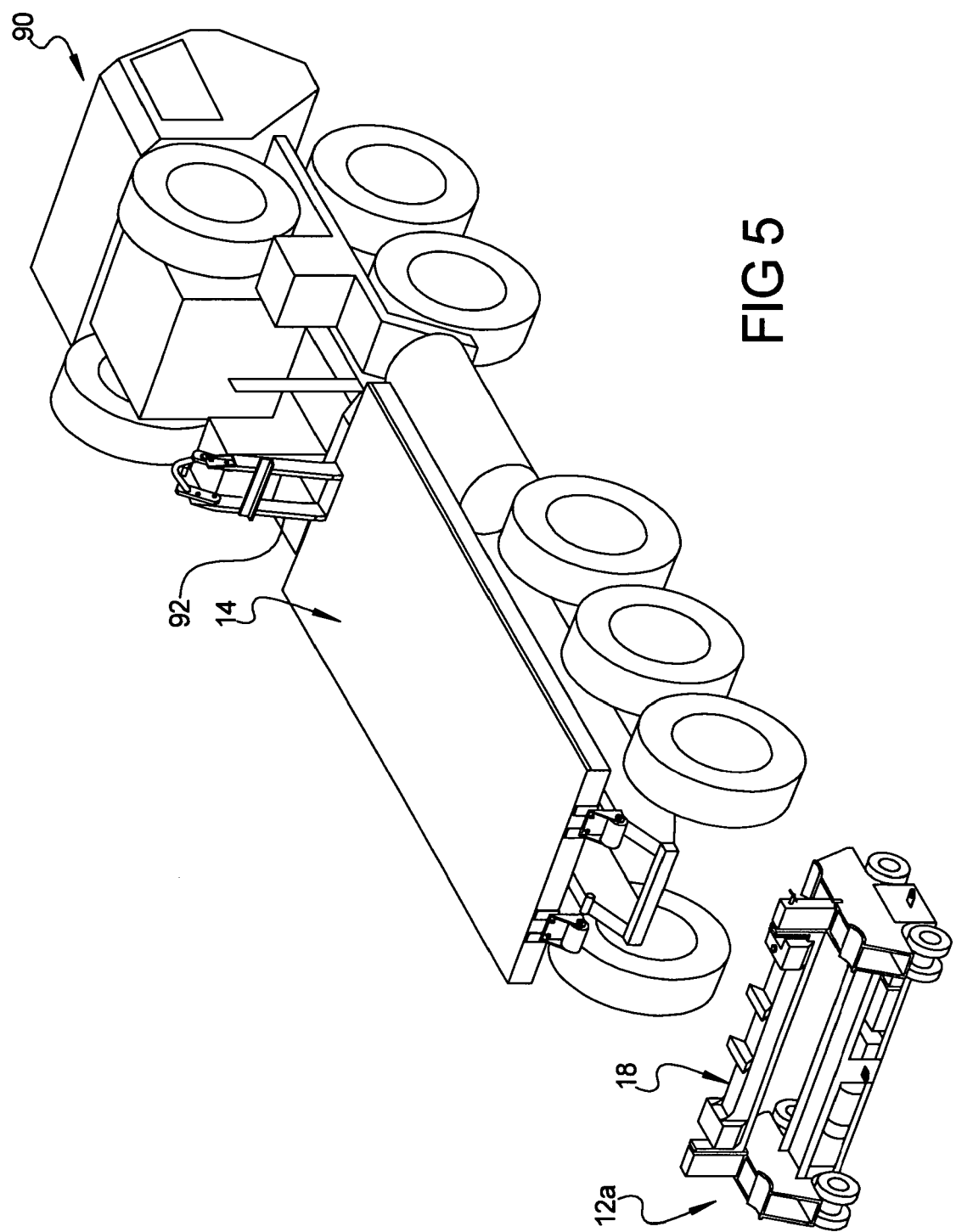
FIG. 5 is a perspective overhead view of the cargo transportation apparatus in accordance with the present invention.
Figure 6:
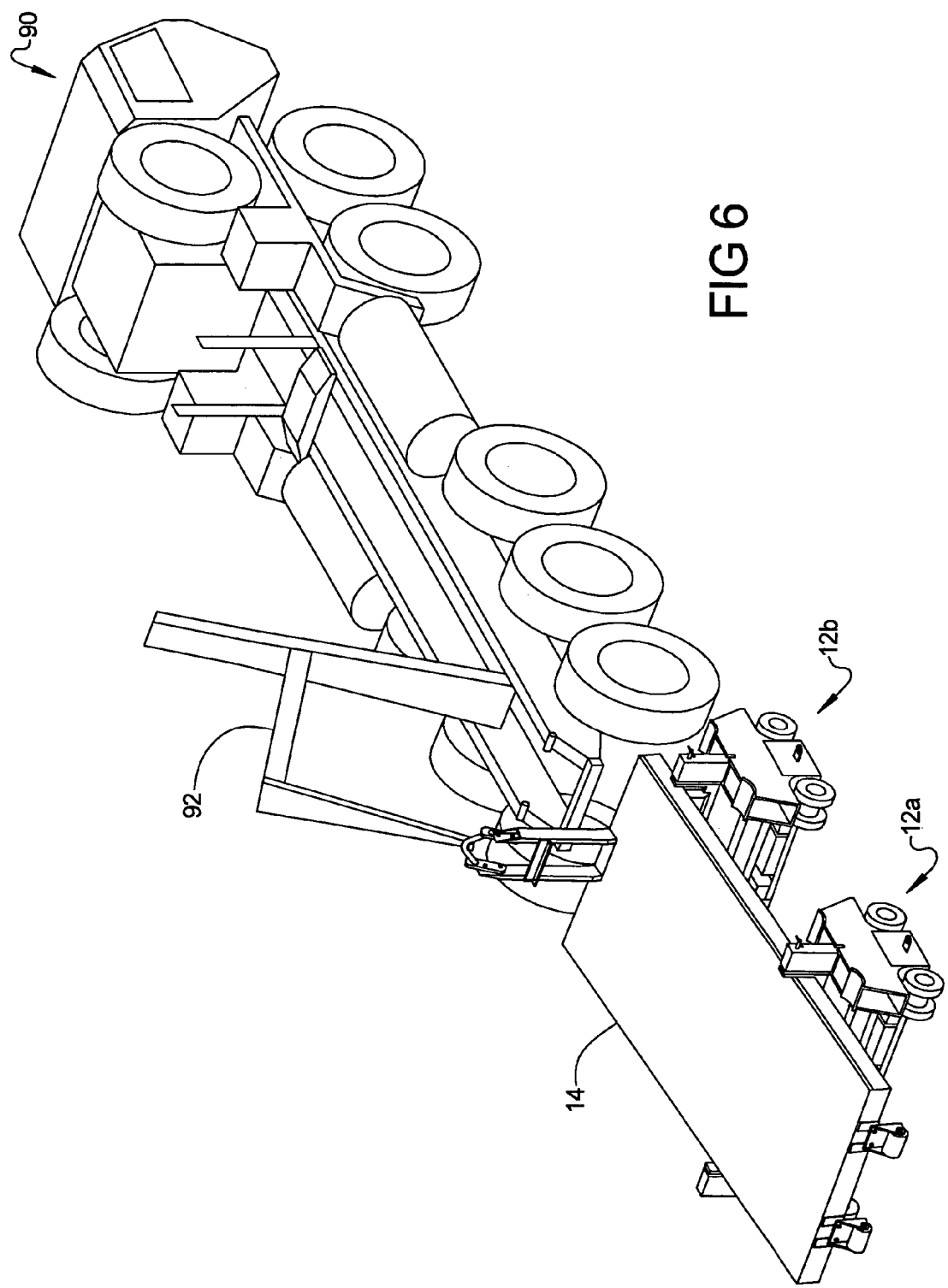
FIG. 6 is a perspective overhead view of the direct loading apparatus handling a cargo platform being loaded or unloaded in accordance with the present invention.

Referring to FIGS. 5 and 6, in an unloading operation of the cargo platform 14, two cargo transportation apparatuses 12a and 12b are combined to form the direct loading system 10 (FIG. 1). The first cargo transportation apparatus 12a is placed in position behind a load handling system vehicle (LHS) 90 that is carrying the cargo platform 14 (FIG. 5) via a bale arm assembly 93. The LHS vehicle 90 is backed into position over the first cargo transportation apparatus 12a. The LHS vehicle 90 is then backed up until an aft end of the LHS vehicle 90 is closely adjacent to the first cargo transportation apparatus 12a to prevent the first cargo transportation apparatus 12a from moving forward. The cradle beam 18 of the first cargo transportation apparatus 12a rocks to coincide with an angle of the cargo platform 14 during this offloading process. Using the securing pin 36, the cradle beam 18 is then locked in position once the cargo platform 14 is fully loaded onto the cradle beam 18. As the unloading process continues, the locking mechanism 76 of the first cargo transportation apparatus 12a is triggered by the lock actuator 80 located on the cradle beam 18 and secures the cargo platform 14 to the cradle beam 18 at approximately one-third the distance from the end of the cargo platform 14.

Once the cargo platform 14 is secured to the first cargo transportation apparatus 12a, the first cargo transportation apparatus 12a is moved, via the wheel assemblies 20, away from the LHS vehicle 90. Referring to FIG. 6, when there is sufficient separation between the first cargo transportation apparatus 12a and the LHS vehicle 90, the second cargo transportation apparatus 12b is moved into position. Afterwards, the wheel assemblies 55 are then manually turned to align them with the wheel assemblies 20 of the first cargo transportation apparatus 12a. Using an LHS vehicle arm 92, the cargo platform 14 is then lowered farther onto the second cargo transportation apparatus 12b. Using the locking mechanism 76 (not shown) of the second cargo transportation apparatus 12b, the cargo platform 14 is secured in position as the second lock actuator 80 (not shown) located on the cradle beam 18 is depressed to lock the cargo platform 14 to the second cargo transportation apparatus 12b (FIG. 1).

The cargo platform 14 is positioned on the direct loading system 10 at a height that permits the cargo platform 14 to extend over an aft end of an aircraft ramp (not shown) when the ramp is in a co-planar position. Thus, if necessary, the cradle beam 18 may be lowered or increased in height to accommodate the height of the aircraft ramp. The cargo platform 14 is then pushed or winched towards the aircraft to provide as much overlap as possible before one end of the cargo platform 14 is lowered onto the aircraft's ramp. If lateral alignment is necessary, the rails 74 of the cradle beam 18 for the first cargo transportation apparatus 12a and/or the second cargo transportation apparatus 12b may be moved sideways along the cradle beam 18 as needed to laterally align the cargo platform 14 with the aircraft ramp within the predetermined distance. Once the end of the cargo platform 14 is sufficiently on the ramp of the aircraft and secured, the first cargo transportation apparatus 12a is lowered, the locking mechanisms 76 are released, the wheel assemblies 20 are turned approximately 90 degrees, and the first cargo transportation apparatus 12a is removed from under the cargo platform 14. The cargo platform 14 is then moved forward up the aircraft's ramp until the second cargo transportation apparatus 12b is near the aft end of the aircraft ramp. Its locking mechanisms 76 are then unlocked, and the cargo platform 14 is moved further upwardly onto the ramp, and subsequently secured into position on the aircraft.

Figure 7:
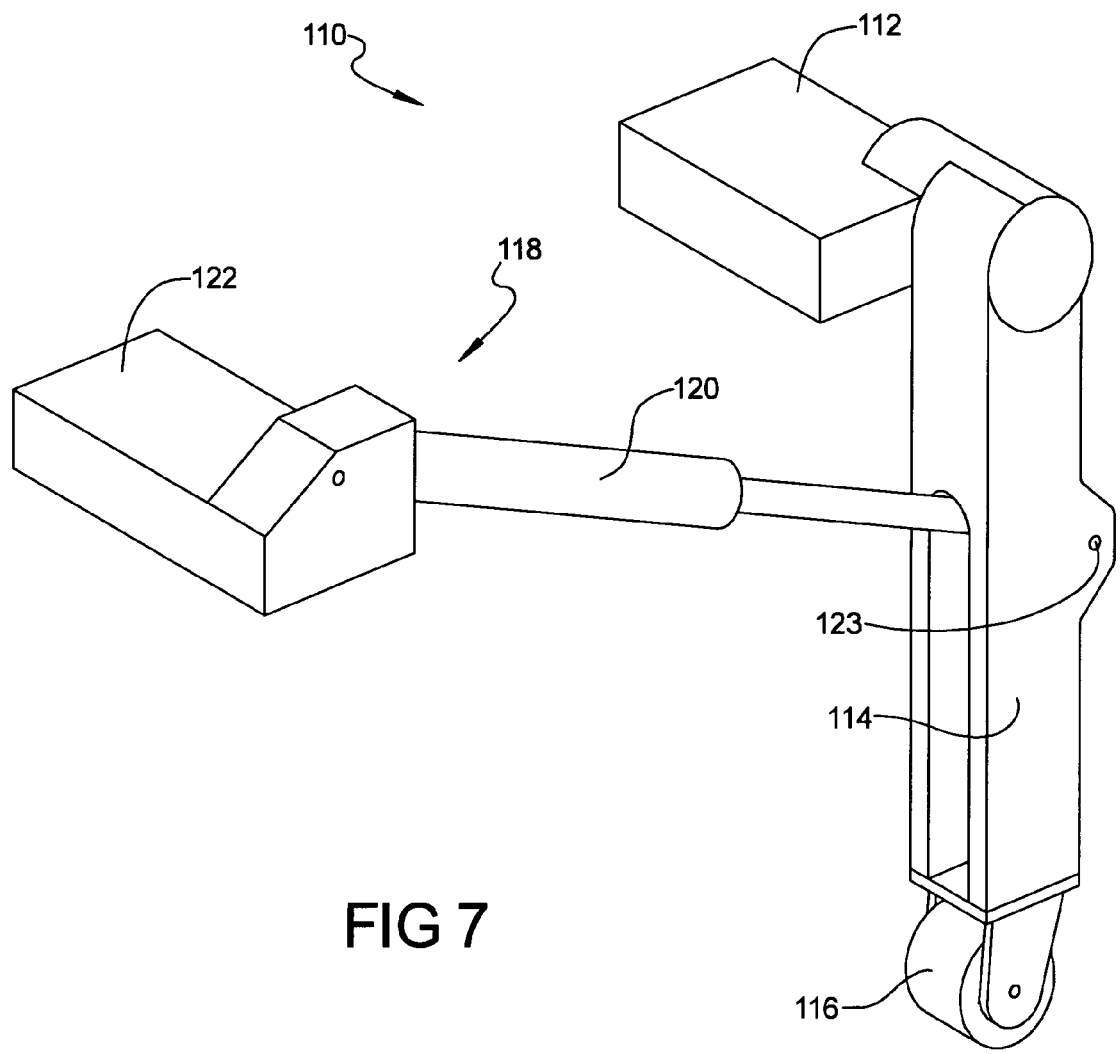
FIG. 7 is a perspective overhead view of an alternative embodiment of the direct loading apparatus in accordance with the present invention.

Referring to FIGS. 7 thru 11, an alternative preferred embodiment 100 of the direct loading system 10 for transporting and handling the cargo platform 14 is provided. The direct loading system 100 comprises a plurality of cargo transportation apparatuses 110a, 110b, 110c, and 110d (FIG. 9), such as four cargo transportation apparatuses. Referring to FIG. 7, a cargo transportation apparatus or apparatus 110 includes a first arm assembly 112, a leg assembly 114, a second arm assembly 118, and a wheel assembly 116. The arm assembly 112 is coupled to the leg assembly 114 and the leg assembly 114 is coupled to the wheel assembly 116. Additionally, the second arm assembly is also coupled to the leg assembly 114.

The arm assembly 112 forms a first forklift pocket beam, and couples to a first forklift slot 113 of the cargo platform 14 (FIG. 11). The first arm assembly 112 is configured to fit into the first forklift slot 113 of the cargo platform 14. The leg assembly 114 supports the cargo platform 14 off the ground. Additionally, the wheel assembly 116 is adapted to swivel to enable the leg assembly 114 to be moved in various directions. The wheel assembly 116 comprises a locking device (not shown) to lock and focus movement of the wheel assembly 116 in a particular direction. Additionally, the locking device may lock the wheel assembly 116 such that the wheel assembly 116 is prevented from rolling.

The second arm assembly 118 comprises a linear hydraulic piston and cylinder 120 and a second forklift pocket beam 122. The linear hydraulic piston and cylinder 120 is pivotally coupled to the leg assembly 114 via a pin 123. The second forklift pocket beam 122 engages a second forklift slot 124 of the cargo platform 14 (FIG. 11). A valve (not shown) located on the leg assembly 114 actuates the linear hydraulic piston and cylinder 120. The linear hydraulic piston and cylinder 120 extends and retracts the leg assembly 114 between first and second positions.

Referring to FIGS. 7 and 10, when the linear hydraulic piston and cylinder 120 positions the leg assembly 114 in the first position, the leg assembly 114 is retracted into a folded position which enables the leg assembly 114 to lower the cargo platform 14 to ground level. As shown in FIG. 11, when the linear hydraulic piston and cylinder 120 positions the leg assembly 114 in the second position, the leg assembly 114 is extended to allow the cargo platform 14 to be loaded or unloaded to/from an aircraft loading ramp.

Referring to FIGS. 9-11, in an offloading operation of the cargo platform 14 using the direct loading system 100, the direct loading system 100 comprises four individual cargo transportation apparatuses 110a, 110b, 110c, 110d. To unload the cargo platform 14, a first pair of the cargo transportation apparatuses 110a, 110b is placed in a first set of forklift slots 113, 124 on opposite sides of the cargo platform 14 as the height of the cargo platform 14 reaches a receiving level (FIG. 8). This first pair of cargo transportation apparatuses 110a, 110b supports an aft end of the cargo platform 14 until a second pair of cargo transportation apparatuses 110c, 110d is placed into a second set of forklift slots 115, 125 on opposite sides of the cargo platform 14 (FIG. 10). The height of each cargo transportation apparatus 110 is adjustable to insure that the cargo platform 14 remains uniform. The direct loading system 100 permits the cargo platform 14 to be easily transferred to and from the LHS vehicle 90 (FIG. 9). Additionally, using the direct loading system 100 allows the user to place or lower the cargo platform 14 close to the ground for storage (FIG. 10).

Referring to FIG. 11, during the loading of the cargo platform 14 onto an aircraft, the cargo platform 14 is held at a height to permit an end of the cargo platform 14 to extend over and be lowered onto an aircraft ramp 126. Once the end of the cargo platform 14 is lowered onto the aircraft ramp 126, the first set of cargo transportation apparatuses 110a, 110b (apparatus 110b being hidden from view in FIG. 11) is removed. The cargo platform 14 is then pushed or winched onto the aircraft. Next, the second set of cargo transportation apparatuses 110c, 110d (apparatus 110d being hidden from view in FIG. 11) is removed; and, the cargo platform 14 is then rolled further onto the aircraft ramp 126. Additionally, if aligning the cargo platform 14 with the aircraft ramp 126 is necessary, each cargo transportation apparatus 110 is capable of being rolled in a direction perpendicular to the longitudinal axis of the aircraft ramp 126 to provide proper alignment before beginning to load the cargo platform onto the aircraft ramp 126.

The above mentioned embodiments are advantageous because each allows a cargo platform to be directly loaded and unloaded to/from an aircraft or an LHS vehicle without the use and need for large and expensive material handling equipment. Additionally, each embodiment diminishes the need for separately transporting various material handling equipment to the onload or offload sites. Another advantage of at least one aspect of the present invention is that it allows a cargo platform to be lowered to ground level and stowed away when not in use.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An apparatus for use in transporting and handling a cargo platform comprising:
   a frame having a cradle beam that receives the cargo platform, wherein the cradle beam is positioned to receive a lower surface of the cargo platform;
   the cradle beam being pivotable between a horizontal position and a non-horizontal position to facilitate loading the cargo platform thereon;
   a locking mechanism having a lock key portion and being operably associated with the cradle beam, and that automatically moves as the cargo platform is rested upon the cradle beam to latch on to a portion of the cargo platform, wherein the locking mechanism secures the cargo platform to the frame;
   a plurality of wheel assemblies for supporting the apparatus as an independent, self standing assembly, and enabling the frame to be wheeled along a ground surface; and
   wherein the cradle beam extends parallel to an axis of rotation of the wheel assemblies, and pivots about an axis that is parallel to said axis of rotation of the wheel assemblies.

2. The apparatus of claim 1, wherein the cradle beam moves laterally a distance to align the cargo platform with an aircraft ramp.

3. The apparatus of claim 1, wherein the locking mechanism includes a lock actuator to automatically activate the locking mechanism to secure the cargo platform to the frame when the cargo platform is seated on the cradle beam.

4. The apparatus of claim 1, wherein the frame further comprises at least one storage unit.

5. The apparatus of claim 1, wherein the cradle beam is adjustable to a desired height level, relative to the frame, from a first position to a second position.

6. The apparatus of claim 5, wherein the desired height level includes a height level that allows the cargo platform to be loaded and unloaded to and from an aircraft ramp placed in a co-planar position relative to the cradle beam.

7. The apparatus of claim 6, wherein the frame further comprises an elevator unit to adjust the cradle beam to the desired height level.

8. A direct loading apparatus comprising:
   a first cargo transportation loader that receives and supports a first portion of a cargo platform from underneath the cargo platform;
   an independent second cargo transportation loader that receives and supports a second portion of the cargo platform;
   each of said first and second cargo transportation loaders having first and second locking mechanisms each including a moveable lock key assembly that automatically latches onto said first and second portions, respectively, of said cargo platform as said cargo platform is lowered onto said first and second cargo transportation loaders, to secure said cargo platform to said cargo transportation loaders;
   the first cargo transportation loader having a first wheel assembly having four wheels for enabling the first cargo transportation loader to be wheeled over a ground surface; and
   the second cargo transportation loader having a second wheel assembly having four wheels for enabling the second cargo transportation loader to be wheeled over a ground surface independently of the first cargo transportation loader, and positioned independently of the first cargo transportation loader when receiving said second portion of said cargo platform.

9. The direct loading apparatus of claim 8, wherein when the first cargo transportation loader and the second cargo transportation loader are not in use, the second cargo transportation loader is stacked upon the first cargo transportation loader.

10. The direct loading apparatus of claim 8, wherein the first cargo transportation loader includes a plurality of recesses that allow the second cargo transportation loader to nest upon the first cargo transportation loader when the first and second cargo transportation loaders are not in use.

11. The direct loading apparatus of claim 8, wherein the second cargo transportation loader includes a plurality of recesses that allow a third cargo transportation loader to nest upon the second cargo transportation loader.

12. A direct loading apparatus for supporting and moving a cargo platform, the apparatus comprising:
   a first cargo transportation loader that receives and supports a first portion of a cargo platform from underneath the cargo platform, said first cargo transportation loader including a first frame for supporting a first wheel system having four wheels for enabling said first cargo transportation loader to be moved along a ground surface while supporting said first portion of said cargo platform, and an elevationally adjustable and pivotal cradle beam; and
   an independent second cargo transportation loader that receives and supports a second portion of the cargo platform, said second cargo transportation loader including a second frame for supporting a second wheel system having four wheels for enabling said second cargo transportation loader to be moved along said ground surface while supporting said second portion of said cargo platform;
   each of said first and second cargo transportation loaders including a locking system for automatically latching on to its respective said portion of said cargo platform when its respective said portion is lowered thereon; and
   said first frame having a plurality of recesses arranged to receive said four wheels of said independent second cargo transportation loader to enable said independent second cargo transportation loader to be stacked on said independent first cargo transportation loader when said independent first and second cargo transportation loaders are not in use.

* * * * *